United States Patent
Dave et al.

(10) Patent No.: US 9,619,643 B2
(45) Date of Patent: *Apr. 11, 2017

(54) JUST IN TIME POLYMORPHIC AUTHENTICATION

(71) Applicant: Bank of America Corporation, Charlotte, NC (US)

(72) Inventors: Apeksh M. Dave, Weddington, NC (US); Vijayanand Jamma, Charlotte, NC (US); Vivekanand Doriaraj, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,506

(22) Filed: May 18, 2016

(65) Prior Publication Data
US 2016/0259931 A1    Sep. 8, 2016

Related U.S. Application Data

(63) Continuation of application No. 14/469,676, filed on Aug. 27, 2014, now Pat. No. 9,363,263.

(51) Int. Cl.
*G06F 21/00*    (2013.01)
*G06F 21/36*    (2013.01)
(Continued)

(52) U.S. Cl.
CPC ............ *G06F 21/36* (2013.01); *G06F 21/31* (2013.01); *G06F 21/32* (2013.01); *G06F 21/42* (2013.01);
(Continued)

(58) Field of Classification Search
CPC .......... G06F 21/30; G06F 21/31; G06F 21/45; G06F 21/313; G06F 21/316; G06F 21/36; G06F 21/46
See application file for complete search history.

(56) References Cited

U.S. PATENT DOCUMENTS

2004/0088587 A1*   5/2004  Ramaswamy .......... G06F 21/31
                                                                 726/5
2006/0294390 A1   12/2006  Navratil et al.
(Continued)

*Primary Examiner* — Edward Zee
(74) *Attorney, Agent, or Firm* — Banner & Witcoff, Ltd.; Michael A. Springs

(57) ABSTRACT

Methods, systems, apparatuses, and computer-readable media for utilizing just-in-time polymorphic authentication techniques to secure information are presented. In one or more embodiments, a computing platform may receive, from a computing device, a request to access a user account. In response to receiving the request to access the user account, the computing platform may dynamically select, based on one or more polymorphic authentication factors, an authentication method for authenticating a user of the computing device, and the authentication method may be selected from a plurality of predefined authentication methods. Subsequently, the computing platform may generate one or more authentication prompts based on the selected authentication method. The computing platform then may provide the one or more authentication prompts to the user of the computing device. The authentication prompts that are selected for and presented to a particular user during a given access attempt may vary across different attempts.

20 Claims, 14 Drawing Sheets

(51) Int. Cl.
*H04L 29/06* (2006.01)
*G06F 21/45* (2013.01)
*G06F 21/32* (2013.01)
*G06F 21/31* (2013.01)
*G06F 21/42* (2013.01)

(52) U.S. Cl.
CPC .............. *G06F 21/45* (2013.01); *H04L 63/08* (2013.01); *H04L 63/083* (2013.01); *H04L 63/0838* (2013.01); *H04L 63/0853* (2013.01); *H04L 63/0861* (2013.01); *H04L 63/105* (2013.01); *G06F 2221/2113* (2013.01); *H04L 63/0876* (2013.01); *H04L 63/108* (2013.01)

(56) References Cited

U.S. PATENT DOCUMENTS

| | | | |
|---|---|---|---|
| 2011/0225625 A1* | 9/2011 | Wolfson | H04L 63/08 726/1 |
| 2013/0212694 A1 | 8/2013 | Castiglia et al. | |
| 2013/0212709 A1 | 8/2013 | Tucker | |
| 2013/0217378 A1 | 8/2013 | Danford et al. | |
| 2013/0238902 A1 | 9/2013 | Oxford | |
| 2013/0239210 A1 | 9/2013 | Stolfo et al. | |
| 2013/0254548 A1 | 9/2013 | Greene et al. | |
| 2013/0254549 A1 | 9/2013 | Greene et al. | |
| 2013/0254550 A1 | 9/2013 | Greene et al. | |
| 2013/0254551 A1 | 9/2013 | Greene et al. | |
| 2013/0254552 A1 | 9/2013 | Greene et al. | |
| 2013/0254553 A1 | 9/2013 | Greene et al. | |
| 2013/0254554 A1 | 9/2013 | Greene et al. | |
| 2013/0254555 A1 | 9/2013 | Greene et al. | |
| 2013/0290226 A1 | 10/2013 | Dokken | |
| 2013/0298192 A1 | 11/2013 | Kumar et al. | |
| 2013/0298230 A1 | 11/2013 | Kumar et al. | |
| 2013/0298242 A1 | 11/2013 | Kumar et al. | |
| 2013/0298243 A1 | 11/2013 | Kumar et al. | |
| 2013/0298244 A1 | 11/2013 | Kumar et al. | |
| 2013/0308774 A1 | 11/2013 | Parrish | |
| 2014/0013434 A1 | 1/2014 | Ranum et al. | |
| 2014/0020049 A1 | 1/2014 | Smith, III et al. | |
| 2014/0081665 A1 | 3/2014 | Holmes | |
| 2014/0087712 A1 | 3/2014 | Danford et al. | |
| 2014/0088744 A1 | 3/2014 | Levien et al. | |
| 2014/0089202 A1 | 3/2014 | Bond et al. | |
| 2014/0101299 A1 | 4/2014 | Cherel et al. | |
| 2014/0106357 A1 | 4/2014 | Berrada et al. | |
| 2014/0108051 A1 | 4/2014 | Bessette | |
| 2014/0108803 A1 | 4/2014 | Probert | |
| 2014/0172925 A1 | 6/2014 | Goldbrenner et al. | |
| 2014/0181013 A1 | 6/2014 | Micucci et al. | |
| 2014/0195930 A1 | 7/2014 | Rajagopal et al. | |
| 2014/0201838 A1 | 7/2014 | Varsanyi et al. | |
| 2014/0230076 A1 | 8/2014 | Micucci et al. | |
| 2014/0237545 A1 | 8/2014 | Mylavarapu et al. | |

\* cited by examiner

Customer Portal

Welcome to Online Banking!

To ensure your account security, we may ask you for different login credentials during different login attempts.

To access your account, please enter your username and password below.

*User Name*    *Password*

More...    Cancel    Continue

FIG. 5

Customer Portal

We have sent a one-time passcode to your registered mobile device.

To access your account, please enter the passcode that we have sent to you.

*Passcode*

More...    Cancel    Continue

FIG. 6

JUST IN TIME POLYMORPHIC AUTHENTICATION

CROSS-REFERENCE TO RELATED APPLICATIONS

This application is a continuation of and claims the benefit of priority to U.S. patent application Ser. No. 14/469,676, filed Aug. 27, 2014, and entitled "Just In Time Polymorphic Authentication," which is incorporated by reference herein in its entirety.

BACKGROUND

Aspects of the disclosure relate to computer hardware and software. In particular, one or more aspects of the disclosure generally relate to computer hardware and software for utilizing just-in-time polymorphic authentication techniques to secure information, such as user account information.

Large organizations, such as financial institutions, may serve many customers, and increasingly, customers of such organizations are using computing devices, including mobile computing devices, to interact with the organizations about the products and/or services offered by these organizations. Some large organizations may even provide specialized websites and/or customer portals for their customers that allow customers to view and/or purchase various products and/or services online, conduct transactions, and view and/or manage one or more accounts. While large organizations may take many steps to ensure the security of customer information and/or user accounts, these organizations may wish to continue pursuing ever greater levels of security in protecting customer information and/or user accounts. In some instances, however, risks to the security of customer information and/or user accounts may arise simply from providing these specialized websites, providing customer portals, and/or providing customers with various other ways of accessing information online.

SUMMARY

Aspects of the disclosure relate to various systems and techniques that provide effective, efficient, scalable, and convenient ways of increasing the security of customer information and customer user accounts, particularly in ways that make it difficult for a person to gain unauthorized access to a user account.

For example, some aspects of the disclosure utilize polymorphic authentication techniques in which the particular authentication prompts that are presented to a user when attempting to access a user account may be selected on-the-fly and may vary between access attempts. As a result, scripted attacks and/or replay attacks that rely on a predictable series of authentication prompts and/or other predictable authentication challenges may be hindered, if not entirely prevented. Similarly, phishing attacks that utilize stolen authentication credentials may be likewise hindered, if not entirely prevented, as a person attempting to gain unauthorized access to a particular user account might not have all of the information needed to access that user account in the particular instance. In some instances, the polymorphic authentication techniques discussed below also may be used to detect and/or trap a malicious person attempting to gain unauthorized access to a user account.

In the online banking context, for example, aspects of the disclosure may enable a financial institution to provide a context-dependent authentication mechanism for customers attempting to access a customer portal and/or an online banking interface associated with such a customer portal. In particular, by dynamically selecting an authentication method to be used in authenticating each different user attempting to access the customer portal in accordance with various aspects of the disclosure discussed in greater detail below, a computing platform providing the customer portal may provide enhanced security for customer information and/or user accounts associated with the customer portal.

In accordance with one or more embodiments, a customer security computing platform having at least one processor, a memory, and a communication interface may receive, via the communication interface, and from a first computing device, a request to access a user account. In response to receiving the request to access the user account, the customer security computing platform may dynamically select, based on one or more polymorphic authentication factors, an authentication method for authenticating a user of the first computing device, and the authentication method may be selected from a plurality of predefined authentication methods. Subsequently, the customer security computing platform may generate one or more authentication prompts based on the selected authentication method. The customer security computing platform then may provide the one or more authentication prompts to the user of the first computing device.

In some embodiments, the one or more polymorphic authentication factors may include one or more time-based factors. Additionally or alternatively, the one or more polymorphic authentication factors may include one or more counter-based factors. Additionally or alternatively, the one or more polymorphic authentication factors may include one or more external risk factors. Additionally or alternatively, the one or more polymorphic authentication factors may include one or more geographic factors. Additionally or alternatively, the one or more polymorphic authentication factors may include one or more event-based factors. Additionally or alternatively, the one or more polymorphic authentication factors may include one or more user-specific factors.

In some embodiments, providing the one or more authentication prompts to the user of the first computing device may include generating at least one user interface configured to receive one or more authentication credentials, and causing the at least one user interface to be presented by the first computing device.

In some embodiments, providing the one or more authentication prompts may include requesting the user of the first computing device to provide password input. Additionally or alternatively, providing the one or more authentication prompts may include requesting the user of the first computing device to provide one-time passcode input. Additionally or alternatively, providing the one or more authentication prompts may include requesting the user of the first computing device to provide biometric input. Additionally or alternatively, providing the one or more authentication prompts may include causing at least two authentication prompts to be presented to the user of the first computing device in a specific order determined based on the one or more polymorphic authentication factors.

In some embodiments, the customer security computing platform may receive, via the communication interface, and from a second computing device different from the first computing device, a request to access a second user account different from the user account to which the first computing device requested access. In response to receiving the request to access the second user account, the computing platform may dynamically select, based on the one or more polymorphic authentication factors, a second authentication method for authenticating a user of the second computing device, and the second authentication method may be selected from the plurality of predefined authentication methods. Subsequently, the customer security computing platform may generate one or more second authentication prompts based on the selected second authentication method. The customer security computing platform then may provide the one or more second authentication prompts to the user of the second computing device.

In some instances, the second authentication method for authenticating the user of the second computing device may be different from the authentication method for authenticating the user of the first computing device.

In some embodiments, providing the one or more second authentication prompts to the user of the second computing device may include providing at least one authentication prompt to the user of the second computing device that was not provided to the user of the first computing device. In other embodiments, providing the one or more second authentication prompts to the user of the second computing device may include providing, to the user of the second computing device, the one or more authentication prompts that were provided to the user of the first computing device in a different sequence.

In some embodiments, the user account may be associated with a customer portal provided by the computing platform, and the second user account may be associated with the customer portal provided by the computing platform. For example, both user accounts may be used when accessing the same customer portal and/or may be otherwise associated with the same customer portal.

In some embodiments, the customer portal provided by the computing platform may include at least one online banking user interface. For example, one or more aspects of the disclosure may be implemented by a financial institution in order to ensure and/or enhance the security of customer information, user accounts, and/or other information associated with a customer portal and one or more online banking user interfaces associated with the customer portal.

BRIEF DESCRIPTION OF THE DRAWINGS

The present disclosure is illustrated by way of example and not limited in the accompanying figures in which like reference numerals indicate similar elements and in which:

FIGS. 5, 6, 7, and 8 depict example graphical user interfaces for utilizing just-in-time polymorphic authentication techniques to secure information in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
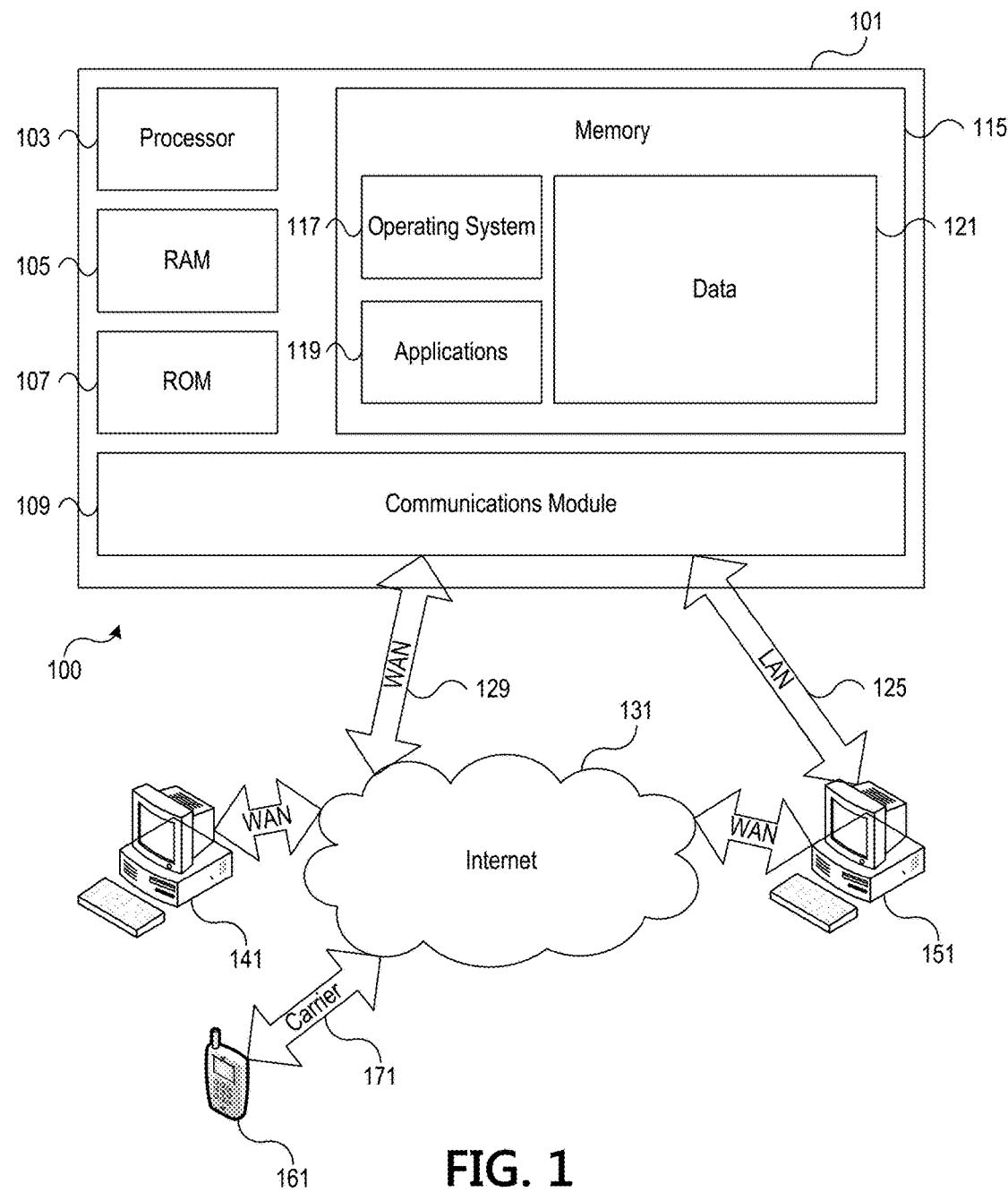
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
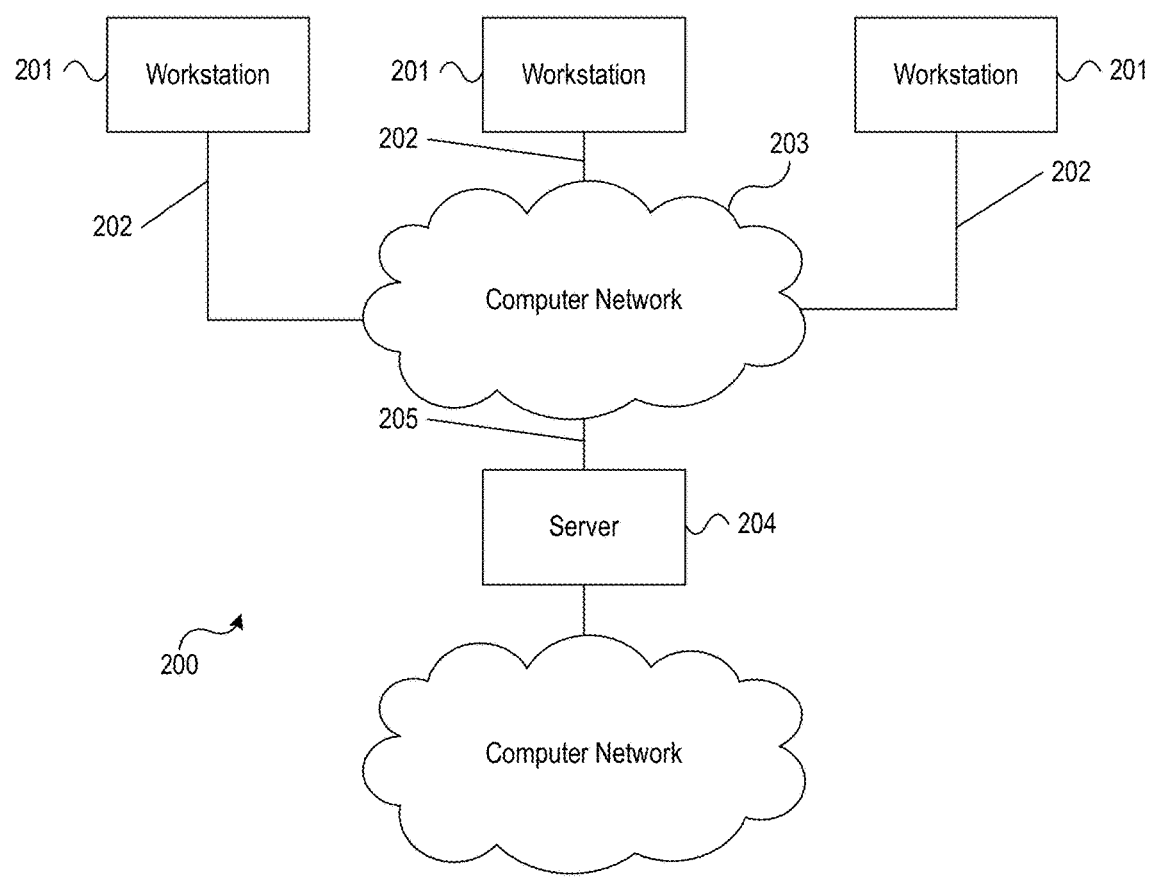
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
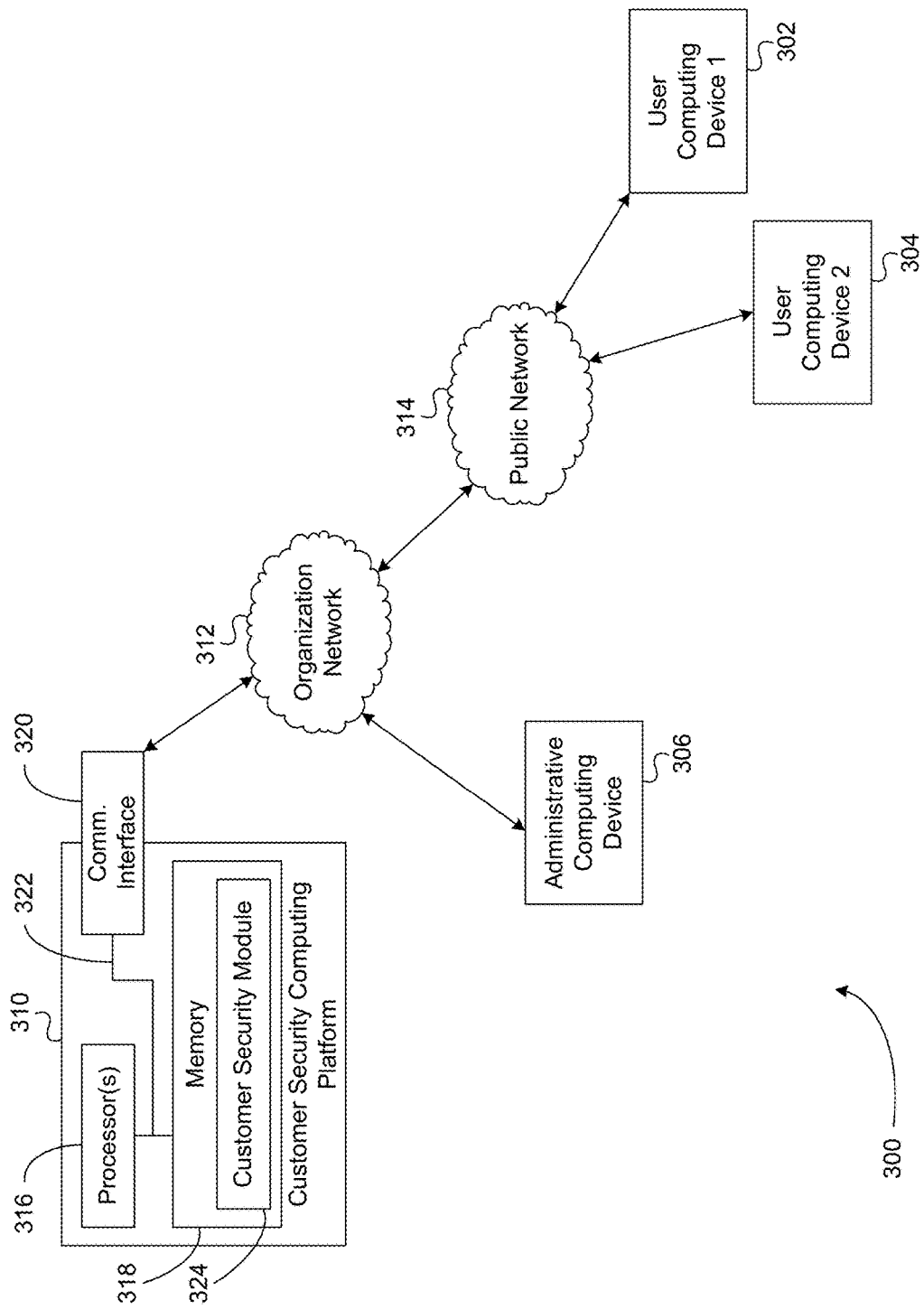
FIG. 3 depicts an illustrative computing environment for utilizing just-in-time polymorphic authentication techniques to secure information in accordance with one or more example embodiments.

FIG. 3 depicts an illustrative computing environment for utilizing just-in-time polymorphic authentication techniques to secure information in accordance with one or more example embodiments. Referring to FIG. 3, computing environment 300 may include one or more computing devices. For example, computing environment 300 may include a first user computing device 302 (which may, e.g., be used by a first customer of an organization, such as a financial institution, as discussed below), a second user computing device 304 (which may, e.g., be used by a second customer of the organization different from the first customer of the organization, as discussed below), and an administrative computing device 306 (which may, e.g., be used by and/or operated by an administrative user or other individual who may be associated with the organization and who may administer and/or otherwise control various computing devices and/or computer systems that are operated by and/or otherwise associated with the organization, as discussed below). User computing device 302, user computing device 304, and administrative computing device 306 may be any type of computing device capable of receiving a user interface, receiving input via the user interface, and communicating the received input to one or more other computing devices. For example, user computing device 302, user computing device 304, and administrative computing device 306 may be a desktop computer, laptop computer, tablet computer, smart phone, or the like. Computing environment 300 also may include one or more computing platforms. For example, computing environment 300 may include customer security computing platform 310. Customer security computing platform 310 may include one or more computing devices configured to perform one or more of the functions described herein. For example, customer security computing platform 310 may include one or more computers (e.g., laptop computers, desktop computers, servers, server blades, or the like).

Computing environment 300 also may include one or more networks, which may interconnect one or more of user computing device 302, user computing device 304, administrative computing device 306, and customer security computing platform 310. For example, computing environment 300 may include organization network 312 and public network 314. Organization network 312 and/or public network 314 may include one or more sub-networks (e.g., LANs, WANs, or the like). Organization network 312 may be associated with a particular organization (e.g., a corporation, financial institution, educational institution, governmental institution, or the like) and may interconnect one or more computing devices associated with the organization. For example, administrative computing device 306 and customer security computing platform 310 may be associated with an organization (e.g., a financial institution), and organization network 312 may be associated with and/or operated by the organization, and may include one or more networks (e.g., LANs, WANs, VPNs, or the like) that interconnect administrative computing device 306 and customer security computing platform 310 and one or more other computing devices and/or computer systems that are used by, operated by, and/or otherwise associated with the organization. Public network 314 may connect organization network 312 and/or one or more computing devices connected thereto (e.g., administrative computing device 306 and customer security computing platform 310) with one or more networks and/or computing devices that are not associated with the organization. For example, user computing device 302 and user computing device 304 might not be associated with an organization that operates organization network 312, and public network 314 may include one or more networks (e.g., the Internet) that connect user computing device 302 and user computing device 304 to organization network 312 and/or one or more computing devices connected thereto (e.g., administrative computing device 306 and customer security computing platform 310).

Customer security computing platform 310 may include one or more processor(s) 316, memory 318, communication interface 320, and data bus 322. Data bus 322 may interconnect processor(s) 316, memory 318, and/or communication interface 320. Communication interface 320 may be a network interface configured to support communication between customer security computing platform 310 and organization network 312, or one or more sub-networks thereof. Memory 318 may include one or more program modules comprising instructions that when executed by the processor(s) 316 cause customer security computing platform 310 to perform one or more functions described herein. For example, memory 318 may include customer security module 324, which may comprise instructions that when executed by processor(s) 316 cause customer security computing platform 310 to perform one or more functions described herein.

Figure 4A:
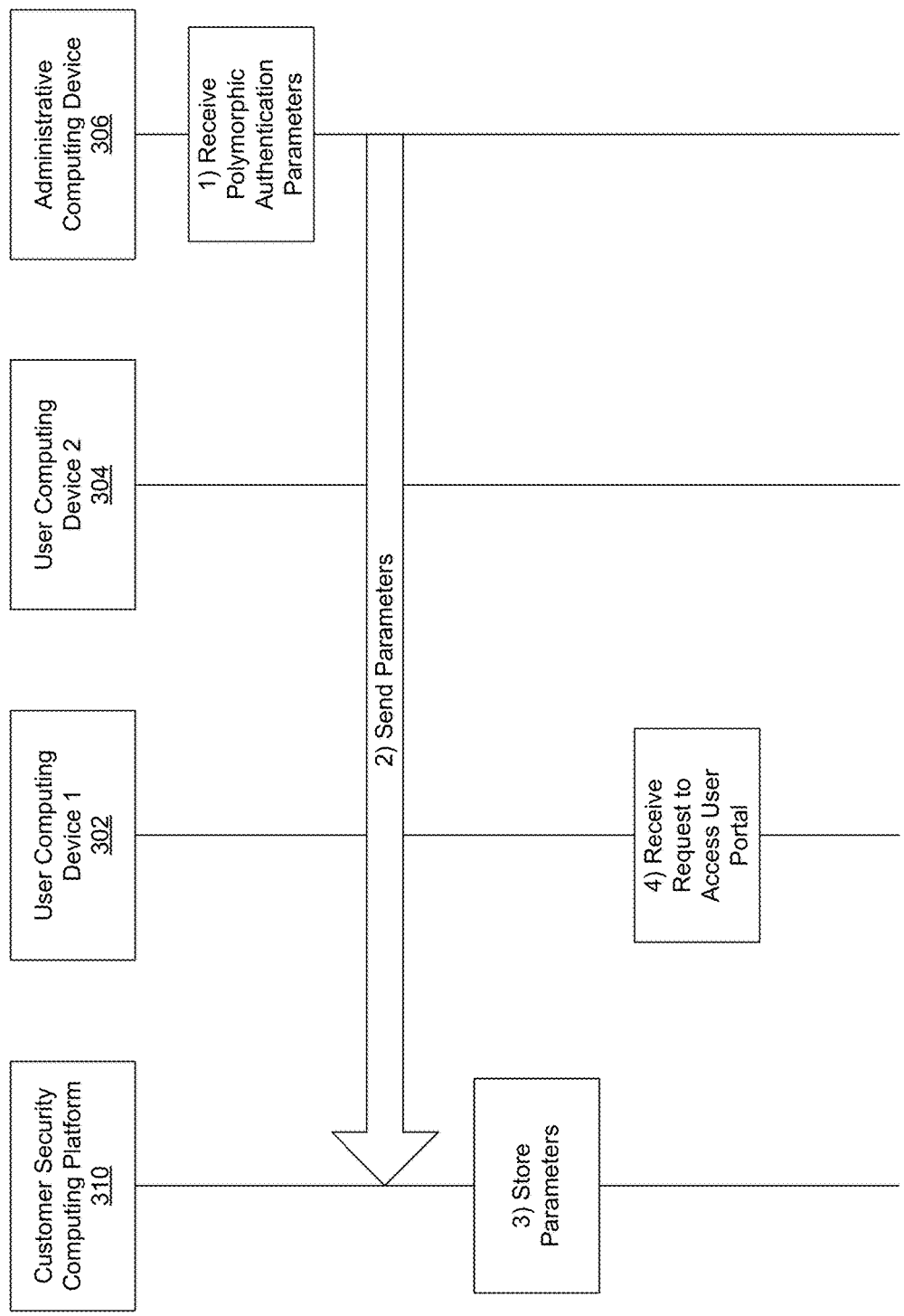
FIGS. 4A, 4B, 4C, 4D, 4E, 4F, 4G, and 4H depict an illustrative event sequence for utilizing just-in-time polymorphic authentication techniques to secure information in accordance with one or more example embodiments.
Figure 4B:
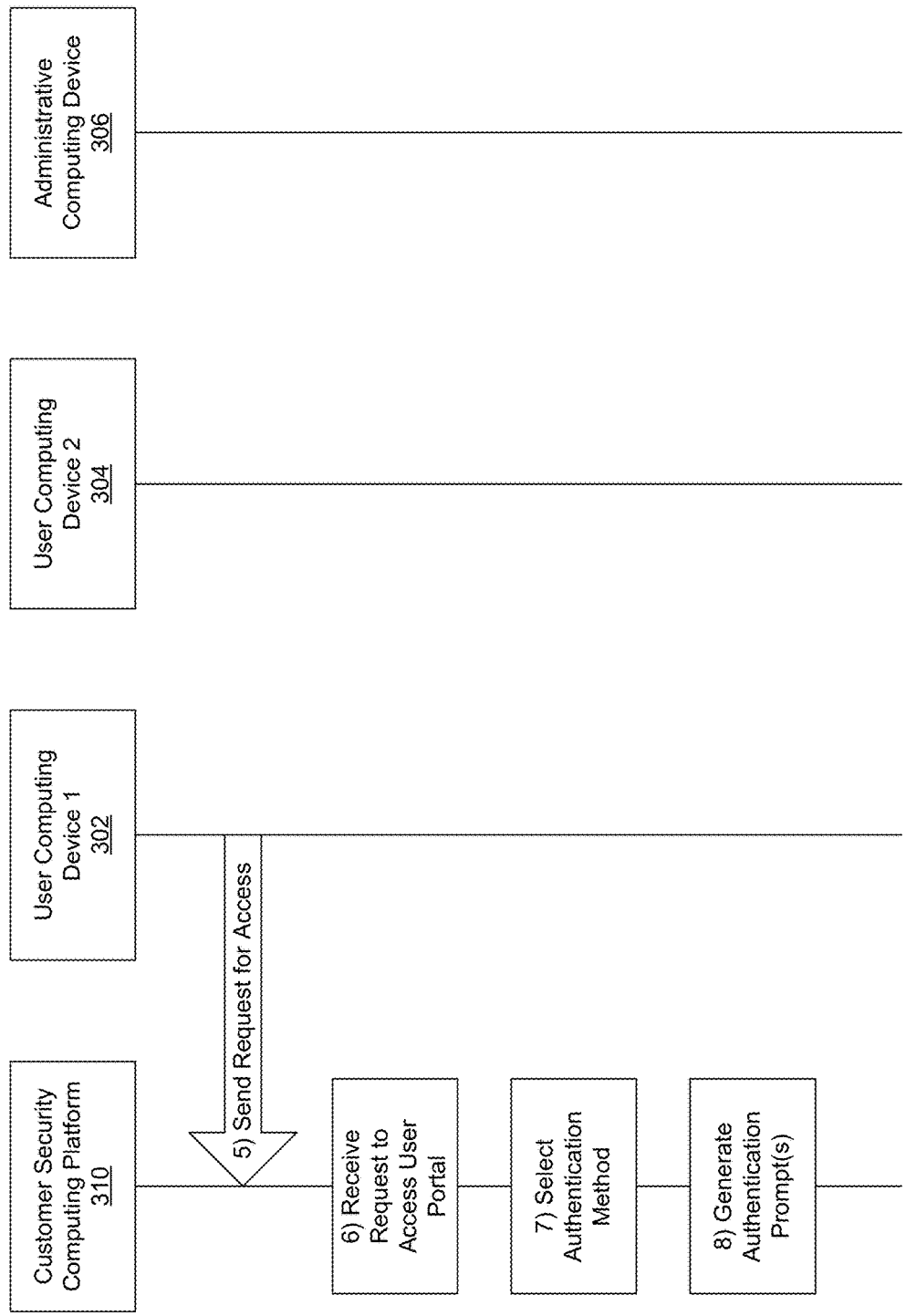
Figure 4C:
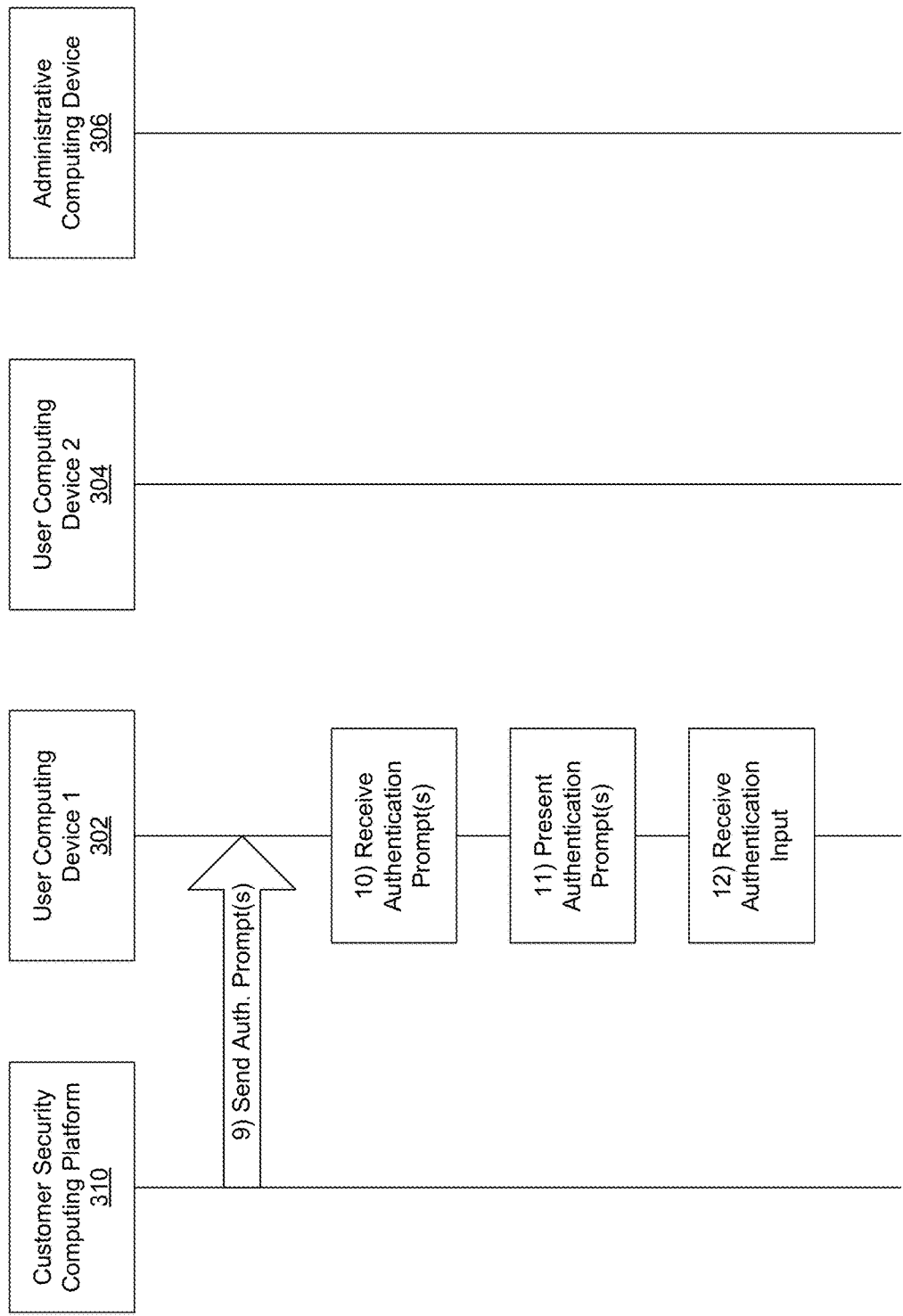
Figure 4D:
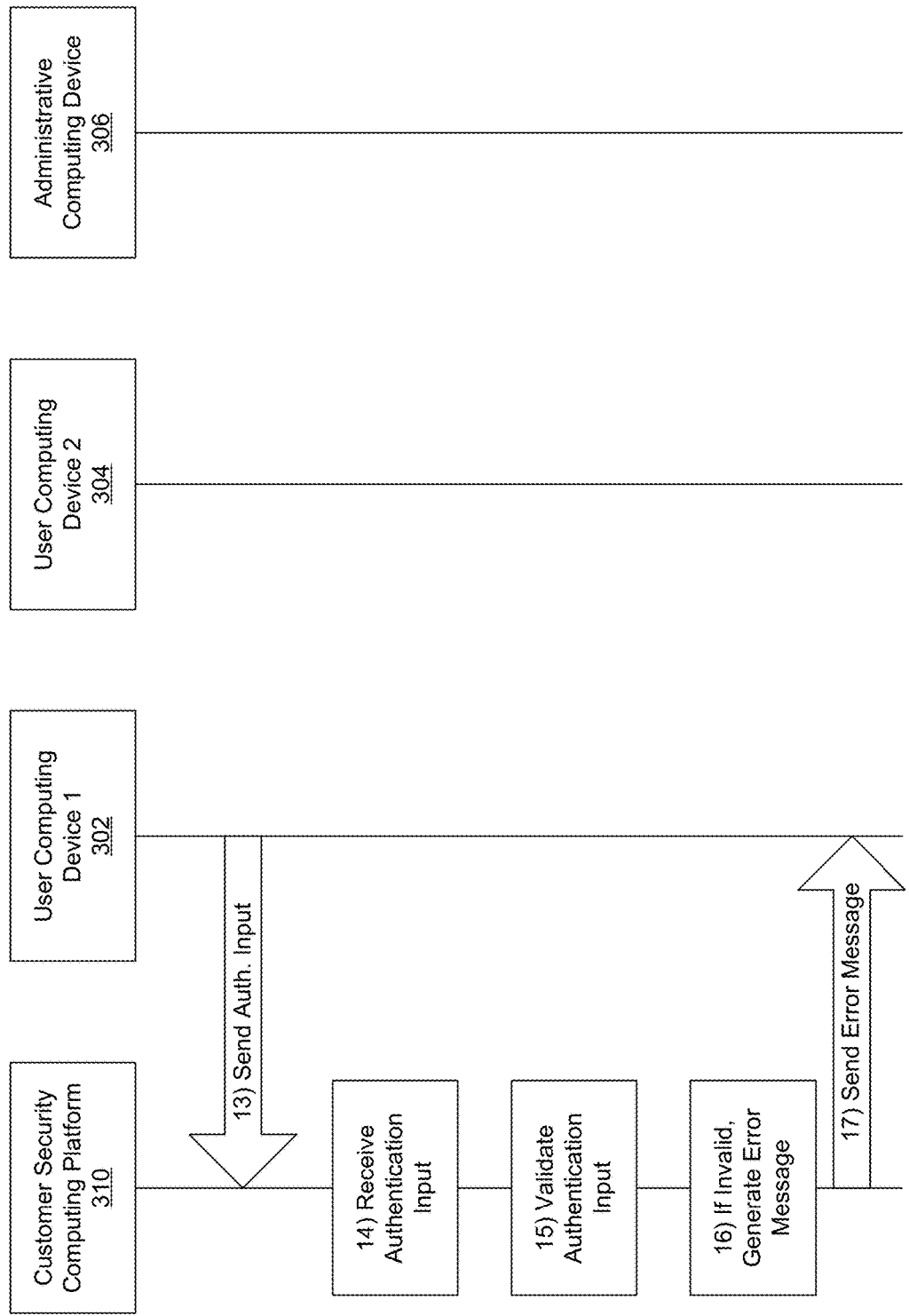
Figure 4E:
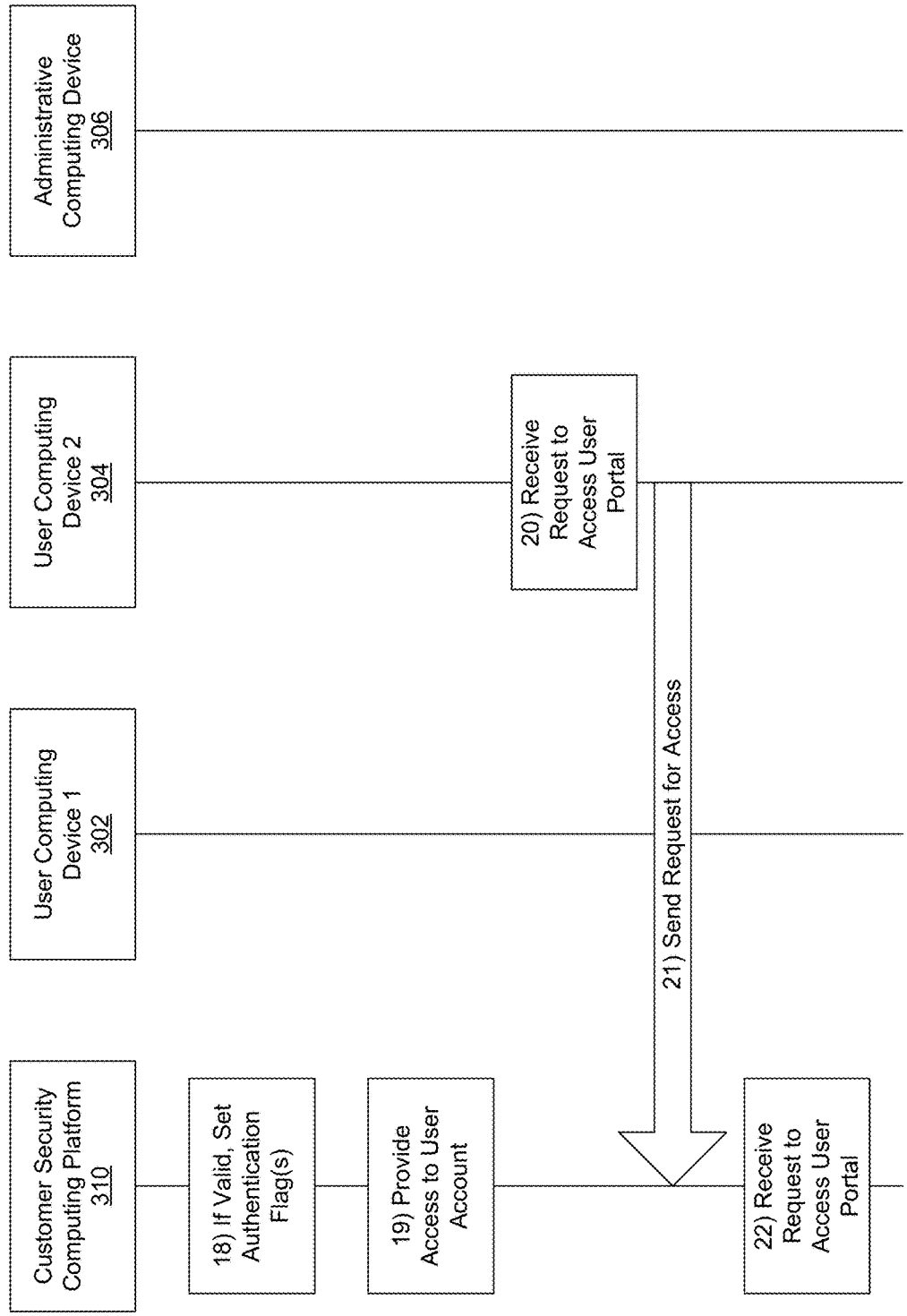
Figure 4F:
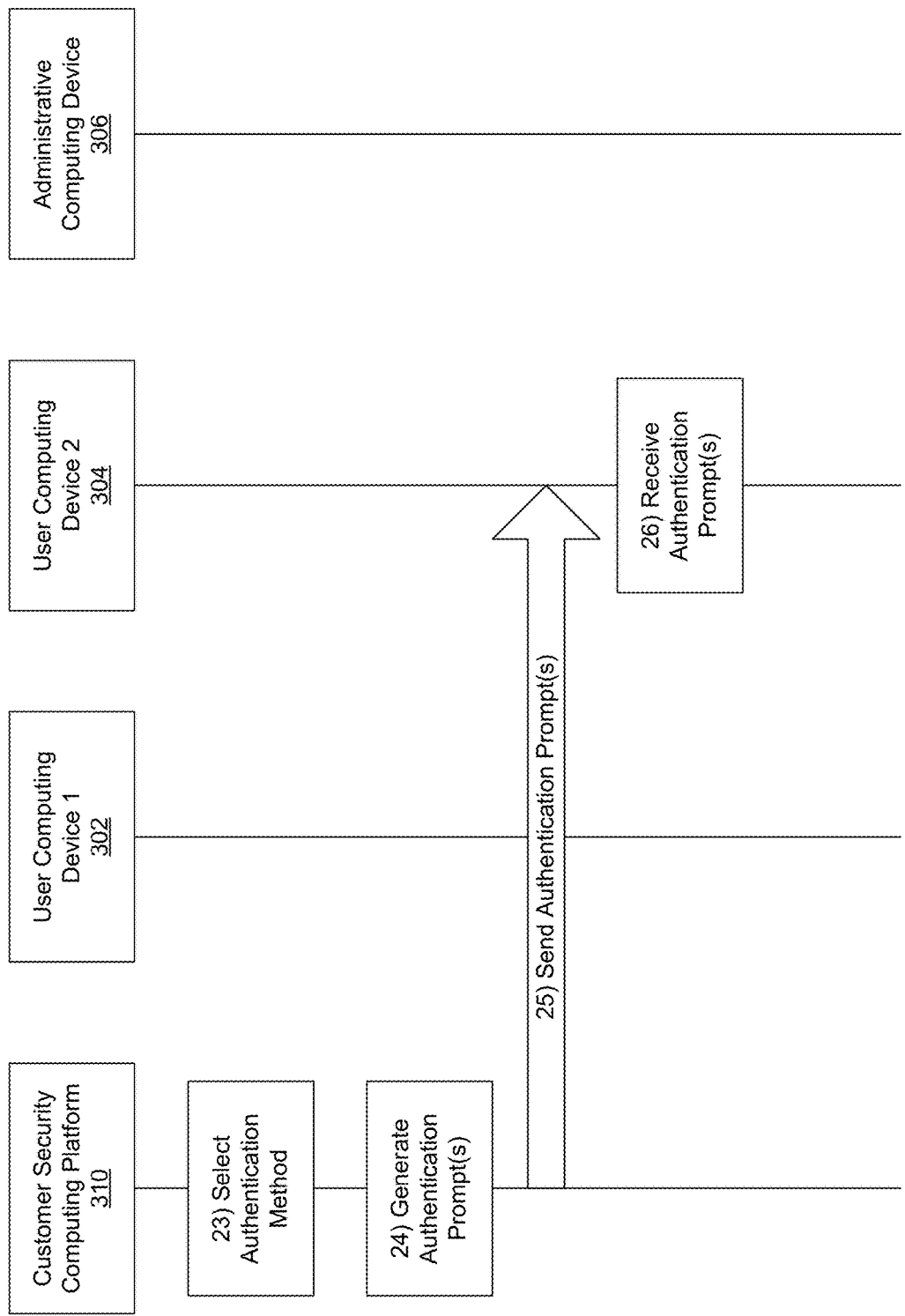
Figure 4G:
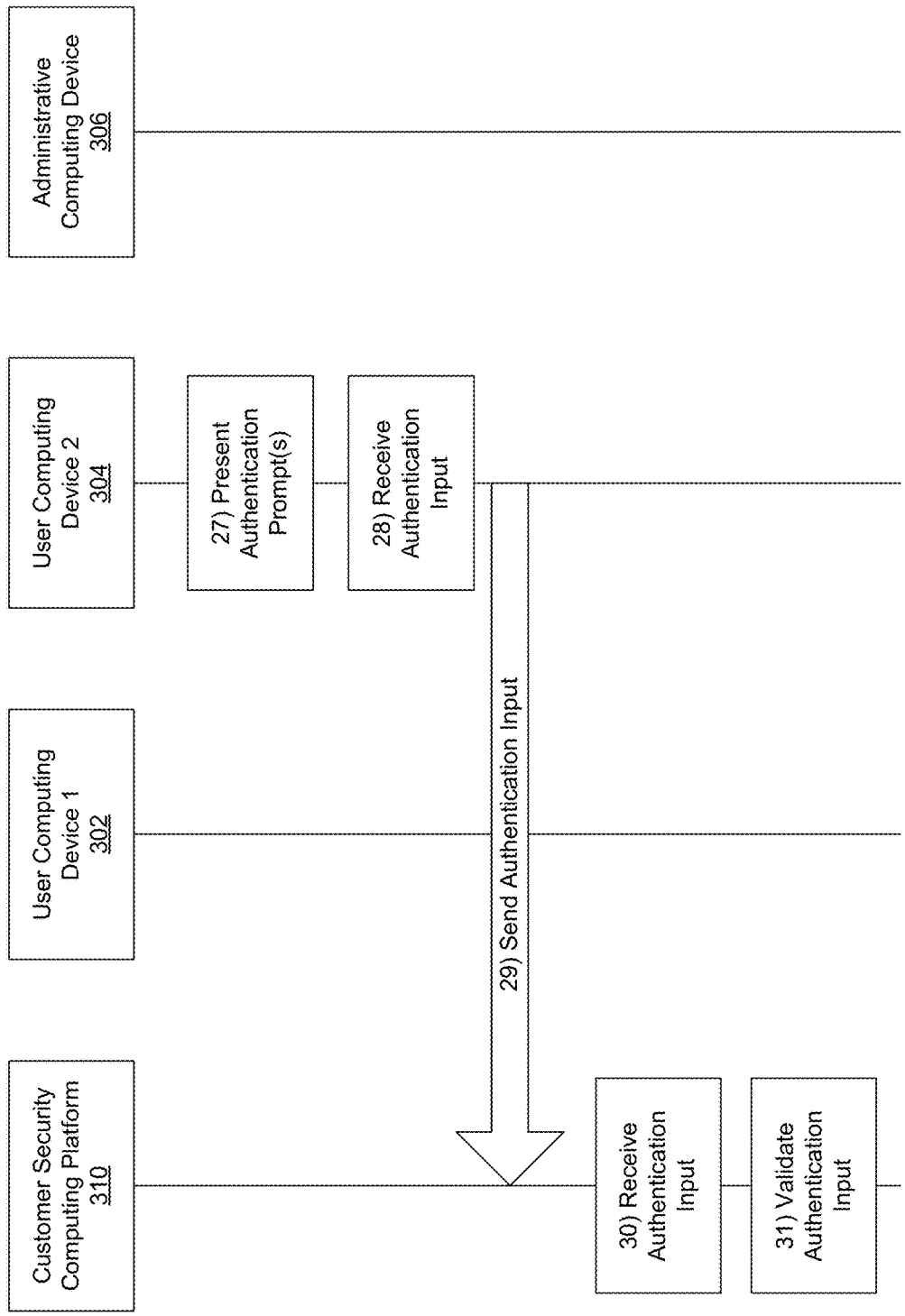
Figure 4H:
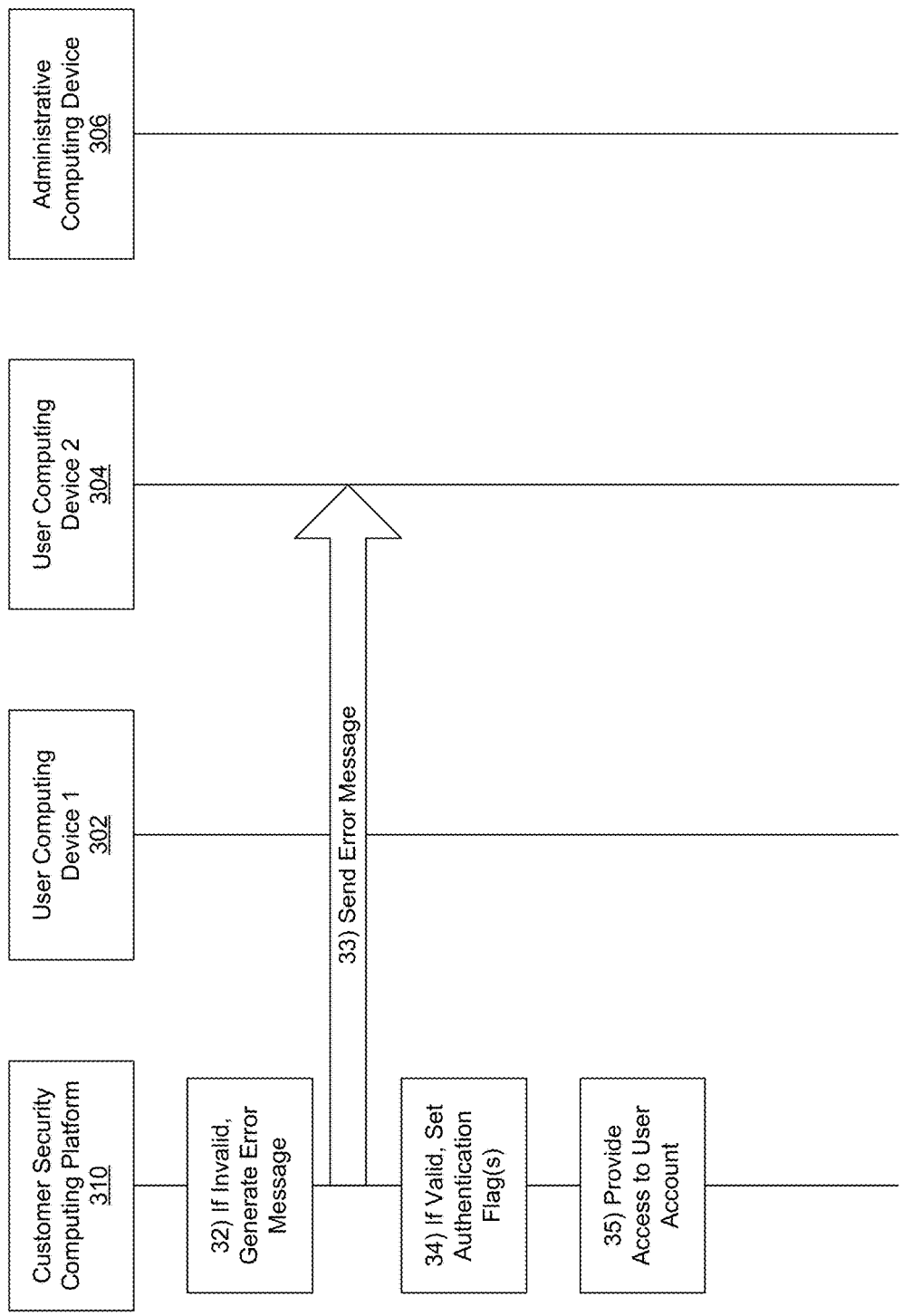

FIGS. 4A, 4B, 4C, 4D, 4E, 4F, 4G, and 4H depict an illustrative event sequence for utilizing just-in-time polymorphic authentication techniques to secure information in accordance with one or more example embodiments. Referring to FIG. 4A, at step 1, administrative computing device 306 may receive one or more polymorphic authentication parameters. Such parameters may, for example, be received from a user of administrative computing device 306 and/or may define and/or update one or more polymorphic authentication factors that may be used in dynamically selecting authentication methods, as discussed below. At step 2, administrative computing device 306 may send the one or more polymorphic authentication parameters to customer security computing platform 310. At step 3, customer security computing platform 310 may store the one or more polymorphic authentication parameters received from administrative computing device 306. For example, at step 3, customer security computing platform 310 may store and/or update one or more library files and/or other information defining one or more polymorphic authentication factors that may be used (e.g., by customer security computing platform 310) in dynamically selecting and/or otherwise determining one or more authentication methods to be used in connection with different access requests, as discussed below.

At step 4, user computing device 302 may receive a request to access a user portal. Such a request may, for example, be received from a user of user computing device 302 and/or may include information identifying a user account to be accessed via the user portal, such as a username, account number, and/or the like. At step 5, user computing device 302 may send a request to access a user portal to customer security computing platform 310. The request may, for example, include any and/or all of the information received from the user of user computing device 302, such as the information identifying a user account to be accessed via the user portal.

At step 6, customer security computing platform 310 may receive the request to access the user portal. For example, at step 6, customer security computing platform 310 may receive, via communication interface 320, and from user computing device 302, a request to access a user account. Such a request may, for example, include information indicating that access is being requested by user computing device 302 to a user portal provided, at least in part, by customer security computing platform 310 and/or information identifying a user account associated with the user portal to which user computing device 302 is requesting access. In addition, such a user account may, for instance, include a collection of information that is maintained in connection with a relationship between an organization, system, or entity and a customer, person, or entity that has been, is, and/or will be authorized to access, view, and/or otherwise use any and/or all of the information included in the collection of information. For example, the user account to which user computing device 302 is requesting access may include a collection of information that is maintained by a financial institution operating customer security computing platform 310 in connection with a relationship between the financial institution and a customer who may be using user computing device 302 to request access to the user portal provided by customer security computing platform 310. Additionally or alternatively, the user portal may include an online banking interface. Such an online banking interface may, for example, include a graphical user interface and/or a collection of graphical user interfaces via which information associated with a financial institution may be presented, accessed, viewed, interacted with, provided, and/or otherwise used. In some instances, an online banking interface may, for example, be presented on and/or as a part of a website, webpage, portal, and/or other interface that may be electronically communicated and/or displayed to one or more users. Additionally or alternatively, an online banking interface may include information associated with one or more bank accounts and/or one or more user accounts that are maintained by and/or are otherwise associated with a financial institution. In some instances, the user portal may include a mobile banking interface. Such a mobile banking interface may, for example, be an online banking interface that is configured to be presented on and/or is presentable on a mobile computing device, such as a laptop computer, tablet computer, smart phone, wearable computing device, and/or other mobile device. In some instances, a mobile banking interface may include the same features of an online banking interface, while in other instances, a mobile banking interface may include one or more different features than an online banking interface. For example, a mobile banking interface may include one or more controls and/or other user interface elements that are designed, selected, and/or configured for optimal presentation, display, and/or use on a mobile computing device and/or on a touch-sensitive display screen of such a mobile computing device.

At step 7, customer security computing platform 310 may select an authentication method to be used in authenticating user computing device 302 and/or a user of user computing device 302 (e.g., so as to enable the user of user computing device 302 to access the user portal provided by customer security computing platform 310). For example, at step 7, in response to receiving the request to access the user account, customer security computing platform 310 may dynamically select, based on one or more polymorphic authentication factors, an authentication method for authenticating a user of the first computing device (e.g., user computing device 302). The authentication method may be selected (e.g., by customer security computing platform 310) from a plurality of predefined authentication methods. In one or more arrangements, the one or more polymorphic authentication factors may be defined by the one or more polymorphic authentication parameters (which may, e.g., have been stored by customer security computing platform 310 at step 3). In addition, the one or more polymorphic authentication parameters may define the plurality of predefined authentication methods (which may, e.g., enable customer security computing platform 310 to select a particular authentication method), and in some instances, the one or more polymorphic authentication parameters may associate particular polymorphic authentication factors with particular authentication methods of the plurality of authentication methods. Such association may, for example, cause customer security computing platform 310 to select a particular authentication method from the plurality of authentication methods when certain polymorphic authentication factors are met.

In some embodiments, the one or more polymorphic authentication factors may include one or more time-based factors. For example, the one or more time-based factors may depend on the current time of day, the current day of the week, the current day of the year, and/or the like. Such time-based factors may, for example, thus cause customer security computing platform 310 to select an authentication method from the plurality of predefined authentication methods based on one or more of the current time of day, the current day of the week, the current day of the year, and/or the like.

In some embodiments, the one or more polymorphic authentication factors may include one or more counter-based factors. For example, the one or more counter-based factors may depend on how many users have been authenticated to the user portal within a predetermined amount of time, which particular authentication methods have been previously selected for authenticating users to the user portal within a predetermined amount of time, and/or the like. Such counter-based factors may, for example, thus cause customer security computing platform 310 to randomly select an authentication method (e.g., based on a randomly generated number) to be used in authenticating user computing device 302 and/or a user thereof. As another example, the counter-based factors may, for instance, cause customer security computing platform 310 to select a different and/or relatively more stringent authentication method for every N-th user (e.g., every sixth user) attempting to access the user portal. As another example, the counter-based factors may, for instance, cause customer security computing platform 310 to select a first authentication method for one set of users attempting to access the user portal (e.g., the first 100 customers attempting to access the user portal) and a second authentication method for a different or subsequent set of users attempting to access the user portal (e.g., the next 100 customers attempting access the user portal after the first 100 customers).

In some embodiments, the one or more polymorphic authentication factors may include one or more external risk factors. For example, the one or more external risk factors may depend on whether one or more computer systems operated by and/or otherwise associated with an organization operating customer security computing platform 310 (which may, e.g., be a financial institution providing the user portal to which user computing device 302 is requesting access) are currently experiencing and/or otherwise facing one or more attacks, such as denial of service attacks, attempted unauthorized access attacks, other types of electronic attacks, and/or the like. Such external risk factors may, for example, thus cause customer security computing platform 310 to select different and/or relatively more stringent authentication methods when the organization's computer systems are under attack from other sources and/or via other channels. For instance, the one or more external risk factors may indicate that a general risk level and/or one or more specific risk levels are relatively high (e.g., exceeding one or more predetermined thresholds compared to one or more corresponding baseline values for such risk levels) for the organization operating customer security computing platform 310, and based on evaluating such external risk factors and determining that one or more risk level(s) are relatively high, customer security computing platform 310 may select different and/or relatively more stringent authentication methods accordingly, such as one or more authentication methods that may be classified as "strict" authentication methods instead of one or more authentication methods that may be classified as "traditional" or "baseline" authentication methods.

In some instances, the external risk factors may be used in additional and/or alternative ways in determining and/or selecting an authentication method. For example, if user computing device 302 is attempting to login into and/or otherwise access customer security computing platform 310 and/or the user portal provided by customer security computing platform 310 from a net-block (which may, e.g., correspond to a group of network addresses, such as Internet Protocol (IP) addresses, that are provided by and/or otherwise associated with a particular internet service provider and/or a particular location) that is also the source of an attack on the organization's computer systems, then the external risk factors may indicate that the level of risk associated with the particular login attempt is relatively high and customer security computing platform 310 may select different and/or relatively more stringent authentication methods accordingly. As another example, if the external risk factors indicate that one or more user accounts associated with the user portal have been accessed without authorization, customer security computing platform 310 may select different and/or relatively more stringent authentication methods for authenticating the user of user computing device 302 in connection with the current login attempt. As another example, if the external risk factors indicate that an attack has been attempted or carried out on one channel (e.g., against one or more interactive voice response (IVR) systems, telephony systems, and/or the like), customer security computing platform 310 may select different and/or relatively more stringent authentication methods for authenticating the user of user computing device 302 in connection with the attempt to access another, different channel (e.g., a web server system and/or an associated online banking channel, mobile banking channel, and/or the like).

In some embodiments, the one or more polymorphic authentication factors may include one or more geographic factors. For example, the one or more geographic factors may depend on where user computing device 302 is located when attempting to access the user portal, whether any attacks against the organization's computer systems are originating from the same location as where user computing device 302 is located when attempting to access the user portal, and/or the like. Such geographic factors may, for example, be based on IP information obtained from user computing device 302, country information obtained from user computing device 302, and/or other location information obtained from user computing device 302. For instance, if user computing device 302 is attempting to login to the portal provided by customer security computing platform 310 from a particular location that the one or more geographic factors indicate as being relatively high risk, customer security computing platform 310 may select different and/or relatively more stringent authentication methods accordingly.

In some embodiments, the one or more polymorphic authentication factors may include one or more event-based factors. For example, the one or more event-based factors may depend on particular functions that the user of user computing device 302 is attempting to access and/or is capable of accessing via the user portal (e.g., the types of transactions that the user is able to and/or is requesting to complete via the user portal, such as money transfer transactions; the types of information that the user is able to and/or is attempting to access via the user portal, such as account statements and/or tax documents; and/or the like). For instance, if the one or more event-based factors indicate that the user of user computing device 302 is attempting to access and/or is capable of accessing a high risk function via the user portal, customer security computing platform 310 may select different and/or relatively more stringent authentication methods accordingly.

In some embodiments, the one or more polymorphic authentication factors may include one or more user-specific factors. For example, the one or more user-specific factors may depend on categorization information associated with the user of user computing device 302 (which may, e.g., associate the user with one or more categories of customers and/or potential customers of the organization), historical information associated with the user of user computing device 302 (which may, e.g., include information identifying significant events in the relationship between the user and the organization, such as information indicating whether the user's account or login information has been previously used without authorization), and/or other types of user-specific information.

At step 8, customer security computing platform 310 may generate one or more authentication prompts. For example, at step 8, customer security computing platform 310 may generate one or more authentication prompts based on the selected authentication method. Each of the one or more authentication prompts may, for instance, be configured to receive and/or prompt the user of user computing device 302 to provide one or more authentication credentials. At step 9, customer security computing platform 310 may send the one or more authentication prompts to user computing device 302. For example, at step 9, customer security computing platform 310 may provide the one or more authentication prompts to the user of the first computing device (e.g., by sending the one or more authentication prompts to user computing device 302).

In some embodiments, providing the one or more authentication prompts to the user of the first computing device may include generating at least one user interface configured to receive one or more authentication credentials and causing the at least one user interface to be presented by the first computing device. For example, in providing the one or more authentication prompts to the user of user computing device 302, customer security computing platform 310 may generate one or more user interfaces that are configured to receive various authentication credentials from the user of user computing device 302 and may send such user interfaces to user computing device 302 to be displayed for and/or otherwise presented to the user of user computing device 302.

In some embodiments, providing the one or more authentication prompts may include requesting the user of the first computing device to provide password input. For example, one or more of the authentication prompts generated by customer security computing platform 310 and provided to the user of user computing device 302 may prompt the user of user computing device to enter one or more account passwords and/or otherwise provide password input. In some embodiments, providing the one or more authentication prompts may include requesting the user of the first computing device to provide one-time passcode input. For example, one or more of the authentication prompts generated by customer security computing platform 310 and provided to the user of user computing device 302 may prompt the user of user computing device to enter a one-time passcode (which may, e.g., be sent by customer security computing platform 310 and/or by another computer system associated with the organization operating customer security computing platform 310 to a mobile device, such as a cellular phone, smart phone, tablet computer, and/or the like, that has been registered with the organization to receive one-time passcodes in connection with requests to access the particular user's user account). In some embodiments, providing the one or more authentication prompts may include requesting the user of the first computing device to provide biometric input. For example, one or more of the authentication prompts generated by customer security computing platform 310 and provided to the user of user computing device 302 may prompt the user of user computing device to capture, submit, and/or otherwise provide biometric input, such as one or more pictures and/or images (which may, e.g., be captured by a camera connected to or included in user computing device 302) for facial recognition, one or more fingerprints (which may, e.g., be captured by a fingerprint reader connected to or included in user computing device 302) for fingerprint recognition, and/or one or more voice samples and/or other sounds (which may, e.g., be captured by a microphone connected to or included in user computing device 302) for voice recognition.

In some embodiments, providing the one or more authentication prompts may include causing at least two authentication prompts to be presented to the user of the first computing device in a specific order determined based on the one or more polymorphic authentication factors. For example, in providing the one or more authentication prompts, customer security computing platform 310 may cause various authentication prompts to be presented to the user of user computing device 302 in a specific order, and customer security computing platform 310 may select and/or otherwise determine the order in which such prompts are to be presented based on the one or more polymorphic authentication factors. For instance, customer security computing platform 310 may cause a first authentication prompt to be presented that prompts the user of user computing device 302 to enter a username and password and a second authentication prompt to be subsequently presented that prompts the user of user computing device 302 to enter a one-time passcode or other token. In another example, customer security computing platform 310 may cause a first authentication prompt to be presented that prompts the user of user computing device 302 to enter a one-time passcode and a second authentication prompt to be subsequently presented that prompts the user of user computing device 302 to enter another one-time passcode (which may, e.g., be sent to the user's registered mobile device after the initial one-time passcode is validated by customer security computing platform 310). In another example, customer security computing platform 310 may cause a first authentication prompt to be presented that prompts the user of user computing device 302 to provide biometric input (e.g., biometric input for facial recognition captured via a camera, biometric input for fingerprint recognition captured via a fingerprint reader, biometric input for voice recognition captured via a microphone, and/or the like) and a second authentication prompt to be subsequently presented that prompts the user of user computing device 302 to enter a one-time passcode. In another example, customer security computing platform 310 may cause a first authentication prompt to be presented that prompts the user of user computing device 302 to provide one type of biometric input (e.g., biometric input for facial recognition captured via a camera) and a second authentication prompt to be subsequently presented that prompts the user of user computing device 302 to provide a different type of biometric input (e.g., biometric input for voice recognition captured via a microphone). In another example, customer security computing platform 310 may cause a first authentication prompt to be presented that prompts the user of user computing device 302 to enter a one-time passcode and a second authentication prompt to be subsequently presented that prompts the user of user computing device 302 to enter a username and/or password. In another example, customer security computing platform 310 may cause a first authentication prompt to be presented that prompts the user of user computing device 302 to enter a one-time passcode and a second authentication prompt to be subsequently presented that prompts the user of user computing device 302 to enter responses to one or more security questions.

Figure 8:
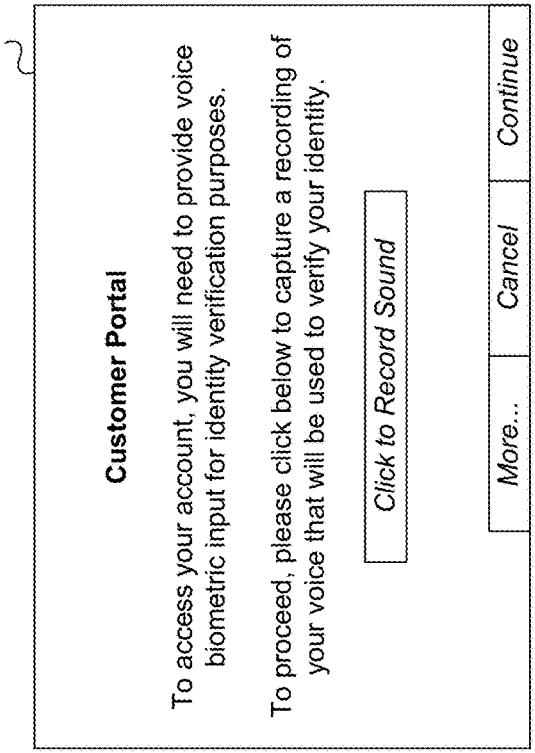
Figure 7:
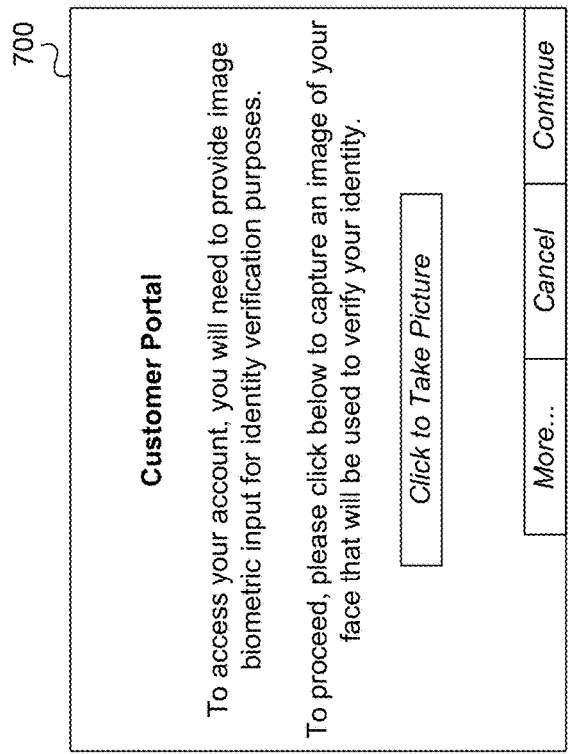

At step 10, user computing device 302 may receive the one or more authentication prompts from customer security computing platform 310. At step 11, user computing device 302 may present the one or more authentication prompts. In presenting the one or more authentication prompts, user computing device 302 may, for example, display, cause to be displayed, and/or otherwise present one or more graphical user interfaces. For example, user computing device 302 may present a graphical user interface similar to graphical user interface 500, which is illustrated in FIG. 5. As seen in FIG. 5, graphical user interface 500 may include one or more fields, controls, and/or other elements that are configured to receive, and may prompt a user to provide, a username and password. As another example, user computing device 302 may present a graphical user interface similar to graphical user interface 600, which is illustrated in FIG. 6. As seen in FIG. 6, graphical user interface 600 may include one or more fields, controls, and/or other elements that are configured to receive, and may prompt a user to provide, a one-time passcode. As another example, user computing device 302 may present a graphical user interface similar to graphical user interface 700, which is illustrated in FIG. 7. As seen in FIG. 7, graphical user interface 700 may include one or more fields, controls, and/or other elements that are configured to receive, and may prompt a user to provide biometric input for facial recognition captured via a camera that may be connected to and/or included in user computing device 302. As another example, user computing device 302 may present a graphical user interface similar to graphical user interface 800, which is illustrated in FIG. 8. As seen in FIG. 8, graphical user interface 800 may include one or more fields, controls, and/or other elements that are configured to receive, and may prompt a user to provide biometric input for voice recognition captured via a microphone that may be connected to and/or included in user computing device 302.

Referring again to FIG. 4C, at step 12, user computing device 302 may receive authentication input. Such authentication input may, for example, be received by user computing device 302 via one or more of the graphical user interfaces discussed above. At step 13, user computing device 302 may send the authentication input to customer security computing platform 310 for validation. At step 14, customer security computing platform 310 may receive the authentication input from user computing device 302. At step 15, customer security computing platform 310 may validate the authentication input received from user computing device 302. For example, at step 15, customer security computing platform 310 may determine whether the authentication input includes a correct username and/or password for the user account to which access is requested, whether a correct one-time passcode was entered, whether biometric input matches one or more biometric records associated with the user account, and/or the like.

If customer security computing platform 310 determines, at step 15, that the authentication input is invalid, then at step 16, customer security computing platform 310 may generate an error message, and at step 17, customer security computing platform 310 may send the generated error message to user computing device 302. Alternatively, if customer security computing platform 310 determines, at step 15, that the authentication input is valid, then at step 18, customer security computing platform 310 may set one or more authentication flags (which may, e.g., indicate the user of user computing device 302 is authorized to access and/or interact with the user portal and/or a particular user account). In addition, at step 19, customer security computing platform 310 may provide access to the user account (e.g., by providing user computing device 302 and/or the user of user computing device 302 with access to the user account).

At step 20, user computing device 304 may receive a request to access a user portal. Such a request may, for example, be received from a user of user computing device 304 and/or may include information identifying a user account to be accessed via the user portal, such as a username, account number, and/or the like. The user account to which user computing device 304 is requesting access may be different from the user account to which user computing device 302 requested access, as user computing device 304 and user computing device 302 may be used by different people who may have different user accounts with the organization operating customer security computing platform 310. At step 21, user computing device 304 may send a request to access a user portal to customer security computing platform 310. The request may, for example, include any and/or all of the information received from the user of user computing device 304, such as the information identifying a user account to be accessed via the user portal.

At step 22, customer security computing platform 310 may receive the request to access the user portal. For example, at step 22, customer security computing platform 310 may receive, via communication interface 320, and from user computing device 304, a request to access a second user account different from the user account to which the first computing device (e.g., user computing device 302) requested access. Such a request may, for example, include information indicating that access is being requested by user computing device 304 to a user portal provided, at least in part, by customer security computing platform 310 and/or information identifying a user account associated with the user portal to which user computing device 304 is requesting access.

At step 23, customer security computing platform 310 may select an authentication method to be used in authenticating user computing device 304 and/or a user of user computing device 304 (e.g., so as to enable the user of user computing device 304 to access the user portal provided by customer security computing platform 310). For example, at step 23, in response to receiving the request to access the second user account, customer security computing platform 310 may dynamically select, based on the one or more polymorphic authentication factors, a second authentication method for authenticating a user of the second computing device (e.g., user computing device 304). The second authentication method may be selected (e.g., by customer security computing platform 310) from the plurality of predefined authentication methods (e.g., the same plurality of predefined authentication methods discussed above and used in authenticating the user of user computing device 302). Additionally, in some instances, the second authentication method for authenticating the user of the second computing device may be different from the authentication method for authenticating the user of the first computing device. For example, in selecting an authentication method to authenticate the user of user computing device 304, customer security computing platform 310 may select a different authentication method than was used to authenticate the user of user computing device 302 (e.g., even though the same authentication factors may be evaluated and/or otherwise used by customer security computing platform 310 in selecting an authentication method).

At step 24, customer security computing platform 310 may generate one or more authentication prompts. For example, at step 24, customer security computing platform 310 may generate one or more second authentication prompts based on the selected second authentication method. As above, each of the one or more authentication prompts may, for instance, be configured to receive and/or prompt the user of user computing device 304 to provide one or more authentication credentials. At step 25, customer security computing platform 310 may send the one or more authentication prompts to user computing device 304. For example, at step 25, customer security computing platform 310 may provide the one or more second authentication prompts to the user of the second computing device (e.g., by sending the one or more authentication prompts to user computing device 304).

In some embodiments, providing the one or more second authentication prompts to the user of the second computing device may include providing at least one authentication prompt to the user of the second computing device that was not provided to the user of the first computing device. For example, in providing the one or more second authentication prompts to the user of user computing device 304, customer security computing platform 310 may provide one or more authentication prompts to the user of user computing device 304 that are different from and/or were not provided to the user of user computing device 302. For instance, in providing the one or more second authentication prompts to the user of user computing device 304, customer security computing platform 310 may provide an authentication prompt that requests the user of user computing device 304 to enter and/or otherwise provide biometric input, even though a similar authentication prompt requesting biometric input might not have been provided to the user of user computing device 302.

In some embodiments, providing the one or more second authentication prompts to the user of the second computing device may include providing, to the user of the second computing device, the one or more authentication prompts that were provided to the user of the first computing device in a different sequence. For example, in providing the one or more second authentication prompts to the user of user computing device 304, customer security computing platform 310 may provide the same authentication prompts to the user of user computing device 304 as were provided to the user of user computing device 302 but in a different order. For instance, in providing the one or more second authentication prompts to the user of user computing device 304, customer security computing platform 310 may provide an authentication prompt that requests the user of user computing device 304 to enter one-time passcode input and a subsequent authentication prompt that requests the user of user computing device 304 to enter a username and password, even though these same authentication prompts might have been presented in reverse order to the user of user computing device 302.

At step 26, user computing device 304 may receive the one or more authentication prompts from customer security computing platform 310. For example, at step 26, user computing device 304 may receive the one or more second authentication prompts discussed above. At step 27, user computing device 304 may present the one or more second authentication prompts. In presenting such authentication prompts, user computing device 304 may, for example, display, cause to be displayed, and/or otherwise present one or more graphical user interfaces, such as one or more of the graphical user interfaces discussed above (e.g., with respect to FIGS. 5-8). At step 28, user computing device 304 may receive authentication input. Such authentication input may, for example, be received by user computing device 304 via one or more of the graphical user interfaces discussed above. At step 29, user computing device 304 may send the authentication input to customer security computing platform 310 for validation. At step 30, customer security computing platform 310 may receive the authentication input from user computing device 304. At step 31, customer security computing platform 310 may validate the authentication input received from user computing device 304. For example, at step 31, customer security computing platform 310 may determine whether the authentication input includes a correct username and/or password for the user account to which access is requested, whether a correct one-time passcode was entered, whether biometric input matches one or more biometric records associated with the user account, and/or the like.

If customer security computing platform 310 determines, at step 31, that the authentication input is invalid, then at step 32, customer security computing platform 310 may generate an error message, and at step 33, customer security computing platform 310 may send the generated error message to user computing device 304. Alternatively, if customer security computing platform 310 determines, at step 31, that the authentication input is valid, then at step 34, customer security computing platform 310 may set one or more authentication flags (which may, e.g., indicate the user of user computing device 304 is authorized to access and/or interact with the user portal and/or a particular user account). In addition, at step 35, customer security computing platform 310 may provide access to the user account (e.g., by providing user computing device 304 and/or the user of user computing device 304 with access to the user account).

In some embodiments, the user account may be associated with a customer portal provided by the computing platform, and the second user account may also be associated with the customer portal provided by the computing platform. For example, the user account which user computing device 302 accesses and the second user account which user computing device 304 accesses may both be associated with the same customer portal that is provided by customer security computing platform 310. In addition, in some embodiments, the customer portal provided by the computing platform may include at least one online banking user interface. For example, the customer portal that is provided by customer security computing platform 310 may include one or more online banking interfaces, such as the online banking interfaces and/or the mobile banking interfaces discussed above.

Figure 9:
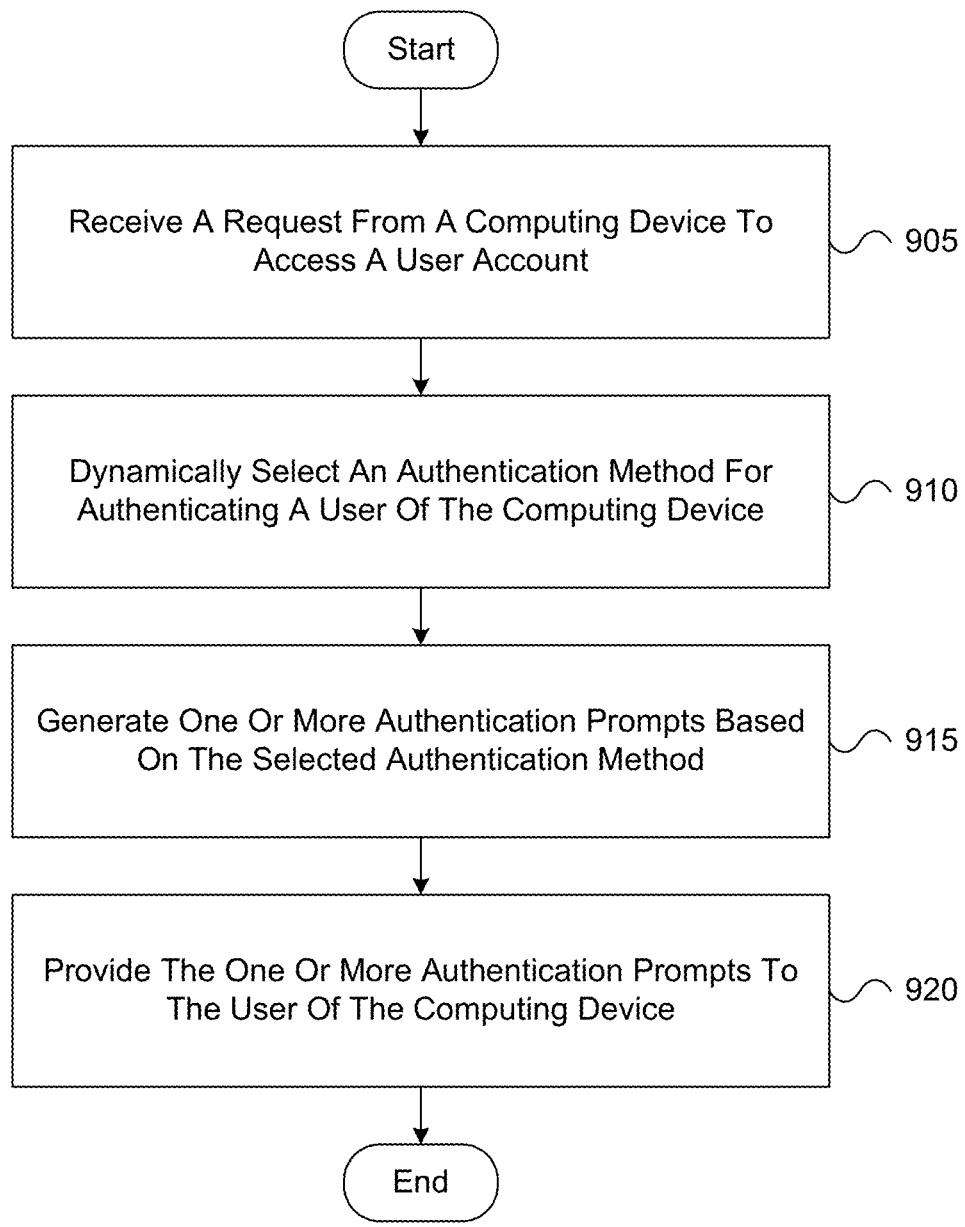
FIG. 9 depicts an illustrative method for utilizing just-in-time polymorphic authentication techniques to secure information in accordance with one or more example embodiments.

FIG. 9 depicts an illustrative method for utilizing just-in-time polymorphic authentication techniques to secure information in accordance with one or more example embodiments. Referring to FIG. 9, at step 905, a computing platform may receive a request from a computing device to access a user account. At step 910, the computing platform may dynamically select an authentication method for authenticating a user of the computing device. At step 915, the computing platform may generate one or more authentication prompts based on the selected authentication method. At step 920, the computing platform may provide the one or more authentication prompts to the user of the computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   at a computing platform comprising at least one processor, memory, and a communication interface:
      receiving, by the at least one processor, via the communication interface, and from a first computing device, a request to access a first user account associated with a customer portal provided by the computing platform, the customer portal comprising at least one online banking user interface configured to present information associated with one or more bank accounts maintained by a financial institution for a user associated with the first user account;
      in response to receiving the request to access the first user account, dynamically selecting, by the at least one processor, based on one or more polymorphic authentication factors, a first authentication method for authenticating a user of the first computing device to the first user account associated with the customer portal, the first authentication method being selected from a plurality of predefined authentication methods comprising a stringent authentication method and a baseline authentication method;

generating, by the at least one processor, one or more authentication prompts based on the first authentication method selected for authenticating the user of the first computing device to the first user account associated with the customer portal; and providing, by the at least one processor, the one or more authentication prompts to the user of the first computing device, wherein the one or more polymorphic authentication factors comprise one or more external risk factors, wherein the customer portal provided by the computing platform is associated with an online banking channel, and wherein dynamically selecting the first authentication method for authenticating the user of the first computing device to the first user account associated with the customer portal comprises selecting the stringent authentication method for authenticating the user of the first computing device to the first user account associated with the customer portal based on at least one external risk factor of the one or more external risk factors indicating that an attack has been attempted on another channel different from the online banking channel.

2. The method of claim 1, wherein the one or more polymorphic authentication factors comprise one or more time-based factors.

3. The method of claim 1, wherein the one or more polymorphic authentication factors comprise one or more counter-based factors.

4. The method of claim 1, wherein the one or more polymorphic authentication factors comprise one or more geographic factors.

5. The method of claim 1, wherein the one or more polymorphic authentication factors comprise one or more event-based factors.

6. The method of claim 1, wherein the one or more polymorphic authentication factors comprise one or more user-specific factors.

7. The method of claim 1, wherein providing the one or more authentication prompts to the user of the first computing device comprises:
generating at least one user interface configured to receive one or more authentication credentials; and
causing the at least one user interface to be presented by the first computing device.

8. The method of claim 1, wherein providing the one or more authentication prompts to the user of the first computing device comprises requesting the user of the first computing device to provide password input.

9. The method of claim 1, wherein providing the one or more authentication prompts to the user of the first computing device comprises requesting the user of the first computing device to provide one-time passcode input.

10. The method of claim 1, wherein providing the one or more authentication prompts to the user of the first computing device comprises requesting the user of the first computing device to provide biometric input.

11. The method of claim 1, wherein providing the one or more authentication prompts to the user of the first computing device comprises causing at least two authentication prompts to be presented to the user of the first computing device in a specific order determined based on the one or more polymorphic authentication factors.

12. The method of claim 1, comprising:
receiving, by the at least one processor, via the communication interface, and from a second computing device different from the first computing device, a request to access a second user account associated with the customer portal provided by the computing platform, the second user account being different from the first user account;

in response to receiving the request to access the second user account, dynamically selecting, by the at least one processor, based on the one or more polymorphic authentication factors, a second authentication method for authenticating a user of the second computing device to the second user account associated with the customer portal, the second authentication method being selected from the plurality of predefined authentication methods;

generating, by the at least one processor, one or more second authentication prompts based on the second authentication method selected for authenticating the user of the second computing device to the second user account associated with the customer portal; and providing, by the at least one processor, the one or more second authentication prompts to the user of the second computing device.

13. The method of claim 12, wherein the second authentication method for authenticating the user of the second computing device to the second user account associated with the customer portal is different from the first authentication method for authenticating the user of the first computing device to the first user account associated with the customer portal.

14. The method of claim 13, wherein providing the one or more second authentication prompts to the user of the second computing device comprises providing at least one authentication prompt to the user of the second computing device that was not provided to the user of the first computing device.

15. A system, comprising:
at least one processor;
a communication interface communicatively coupled to the at least one processor; and
memory storing computer-readable instructions that, when executed by the at least one processor, cause the system to:
receive, via the communication interface, and from a first computing device, a request to access a first user account associated with a customer portal provided by the system, the customer portal comprising at least one online banking user interface configured to present information associated with one or more bank accounts maintained by a financial institution for a user associated with the first user account;
in response to receiving the request to access the first user account, dynamically select, based on one or more polymorphic authentication factors, a first authentication method for authenticating a user of the first computing device to the first user account associated with the customer portal, the first authentication method being selected from a plurality of predefined authentication methods comprising a stringent authentication method and a baseline authentication method;
generate one or more authentication prompts based on the first authentication method selected for authenticating the user of the first computing device to the first user account associated with the customer portal; and
provide the one or more authentication prompts to the user of the first computing device, wherein the one or more polymorphic authentication factors comprise one or more external risk factors, wherein the customer portal provided by the system is associated with an online banking channel, and wherein dynamically selecting the first authentication method for authenticating the user of the first computing device to the first user account associated with the customer portal comprises selecting the stringent authentication method for authenticating the user of the first computing device to the first user account associated with the customer portal based on at least one external risk factor of the one or more external risk factors indicating that an attack has been attempted on another channel different from the online banking channel.

16. The system of claim 15, wherein the memory stores additional computer-readable instructions that, when executed by the at least one processor, cause the system to:

receive, via the communication interface, and from a second computing device different from the first computing device, a request to access a second user account associated with the customer portal provided by the system, the second user account being different from the first user account;

in response to receiving the request to access the second user account, dynamically select, based on the one or more polymorphic authentication factors, a second authentication method for authenticating a user of the second computing device to the second user account associated with the customer portal, the second authentication method being selected from the plurality of predefined authentication methods;

generate one or more second authentication prompts based on the second authentication method selected for authenticating the user of the second computing device to the second user account associated with the customer portal; and provide the one or more second authentication prompts to the user of the second computing device.

17. The system of claim 15, wherein providing the one or more authentication prompts to the user of the first computing device comprises causing at least two authentication prompts to be presented to the user of the first computing device in a specific order determined based on the one or more polymorphic authentication factors.

18. The system of claim 16, wherein the second authentication method for authenticating the user of the second computing device to the second user account associated with the customer portal is different from the first authentication method for authenticating the user of the first computing device to the first user account associated with the customer portal.

19. The system of claim 18, wherein providing the one or more second authentication prompts to the user of the second computing device comprises providing at least one authentication prompt to the user of the second computing device that was not provided to the user of the first computing device.

20. One or more non-transitory computer-readable media storing instructions that, when executed by a computing platform comprising at least one processor, memory, and a communication interface, cause the computing platform to:

receive, via the communication interface, and from a first computing device, a request to access a first user account associated with a customer portal provided by the computing platform, the customer portal comprising at least one online banking user interface configured to present information associated with one or more bank accounts maintained by a financial institution for a user associated with the first user account;

in response to receiving the request to access the first user account, dynamically select, based on one or more polymorphic authentication factors, a first authentication method for authenticating a user of the first computing device to the first user account associated with the customer portal, the first authentication method being selected from a plurality of predefined authentication methods comprising a stringent authentication method and a baseline authentication method;

generate one or more authentication prompts based on the first authentication method selected for authenticating the user of the first computing device to the first user account associated with the customer portal; and provide the one or more authentication prompts to the user of the first computing device, wherein the one or more polymorphic authentication factors comprise one or more external risk factors, wherein the customer portal provided by the computing platform is associated with an online banking channel, and wherein dynamically selecting the first authentication method for authenticating the user of the first computing device to the first user account associated with the customer portal comprises selecting the stringent authentication method for authenticating the user of the first computing device to the first user account associated with the customer portal based on at least one external risk factor of the one or more external risk factors indicating that an attack has been attempted on another channel different from the online banking channel.

* * * * *